(12) United States Patent
Bhat

(10) Patent No.: US 12,450,037 B1
(45) Date of Patent: Oct. 21, 2025

(54) AUTOMATIC GENERATION AND EXECUTION OF COMPUTER-EXECUTABLE COMMANDS USING ARTIFICIAL INTELLIGENCE MODELS

(71) Applicant: Citibank, N.A., New York, NY (US)

(72) Inventor: Ganesh Prasad Bhat, New Jersey, NJ (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 19/217,943

(22) Filed: May 23, 2025

(51) Int. Cl.
G06F 8/35 (2018.01)

(52) U.S. Cl.
CPC ..................... G06F 8/35 (2013.01)

(58) Field of Classification Search
CPC ........................................ G06F 8/35
USPC ........................................ 717/106
See application file for complete search history.

(56) References Cited

U.S. PATENT DOCUMENTS

2022/0164224 A1* 5/2022 Mallavarapu ......... G06F 9/4881
2025/0123819 A1* 4/2025 Khemka ................ G06N 20/00

* cited by examiner

Primary Examiner — Hanh Thi-Minh Bui
(74) Attorney, Agent, or Firm — Perkins Coie LLP

(57) ABSTRACT

Systems and methods disclosed herein automatically generate and executing computer programs using artificial intelligence (AI) models. The system obtains an output generation request (e.g., from a graphical user interface (GUI)) to generate an output using an unstructured dataset. The system determines a feature set of the unstructured dataset using a first AI model set, and dynamically generates a programmatic workflow set using a second AI model set (same as or different from the first AI model set) based on the feature set to be stored in a distributed database. The system automatically executes the programmatic workflow set using a third AI model set (same as or different from the first and/or second AI model sets) to generate an artifact responsive to the output generation request. The system displays (e.g., on the GUI) representations of the output generation request, programmatic workflow set, and/or generated artifact.

20 Claims, 12 Drawing Sheets

Input

File with information pertaining to the initiation of a wire transfer. (Supported file types: PDF)

Instructions

1. Select one of the samples below or leverage your own document. For the latter, drag and drop your source file or "browse files" to upload a custom file from your computer.
2. Once file is selected, click "Extract Instructions" to see the result.

Output

1. All recognized wire transfer instructions will be extracted from the document
2. Instructions will be exported as a JSON file as well as ticket to be processed by the banker.
3. Client view: Notification confirming receipt of the particular request Please select one of the samples below or upload a file that you would like to extract wire instructions from:

☐ Single Instructions                ■ Drag & Drop file or Choose File to upload
                                       Supported file formats are: PDF Alternatively, you can type or paste your own content in the field below:

Arial ∨ | 11 ∨ | B *I* U | ⊬ A | AA | ≡ ≡ ≡ | ∞ 🖼 " | 🖻

To: clarence.witt@prosper.com
From: Mitchell@clientgoods.com
Subject: Wire Transfer
Dear Clarence,
Please move $4,500.90 from My personal checking account # 47586970 at Bank X to the Client Goods Inc. discretionary escrow account (485960703) at Bank of America. ABA: 021030450. Ref: Invoice 47586B.
Thanks,
Mitchell Goodman
CFO
Client Goods Inc.

Paste your transaction ( CLEAR FORM )  ( EXTRACT INSTRUCTIONS )

*FIG. 2A*

Result

To: clarence.witt@prosper.com
From: Mitchell@clientgoods.com
Subject: Wire Transfer
Dear Clarence, Please move [$ | Wire Amount Currency] [4,500.90 | Wire Amount] from [My personal checking | Source Account Name] account # [47586970 | Source Account Number] at [Citi | Source Bank Name] to [the Client Good Inc. discretionary escrow | Destination Account Name] Account ( [485960703 | Destination Account Number] at [Bank of America | Destination Bank Name] ABA: [021030450 | Destination Routing Number] Ref: [Invoice 475868 | Payment Reference Number]

Thanks,
Michell Goodman
CFO
Client Goods Inc.

*FIG. 2C*

AUTOMATIC GENERATION AND EXECUTION OF COMPUTER-EXECUTABLE COMMANDS USING ARTIFICIAL INTELLIGENCE MODELS

BACKGROUND

A smart contract is a computer program or a transaction protocol that automatically executes, controls, or documents events and actions according to the terms of a contract or an agreement. Smart contracts operate based on predefined rules and conditions, and when the conditions are met, the contract automatically triggers the specified actions. In some cases, smart contracts are stored and replicated on a blockchain network. Deployment of a smart contract on a blockchain occurs by sending a transaction to the blockchain. The transaction includes the compiled code for the smart contract as well as a receiver address. The transaction is incorporated in a block that is added to the blockchain, at which point the smart contract's code executes to establish the initial state of the smart contract. However, once a smart contract is executed, it is difficult to ensure the smart contract's ongoing compliance with guidelines and adapt the smart contract to changing conditions.

BRIEF DESCRIPTION OF THE DRAWINGS

FIG. 2A is a screenshot of a user interface illustrating uploading unstructured data to a data generation platform in accordance with some implementations of the present technology.

FIG. 2C is a screenshot of the user interface displaying the extracted features according to some implementations of the present technology.

Figure 1:
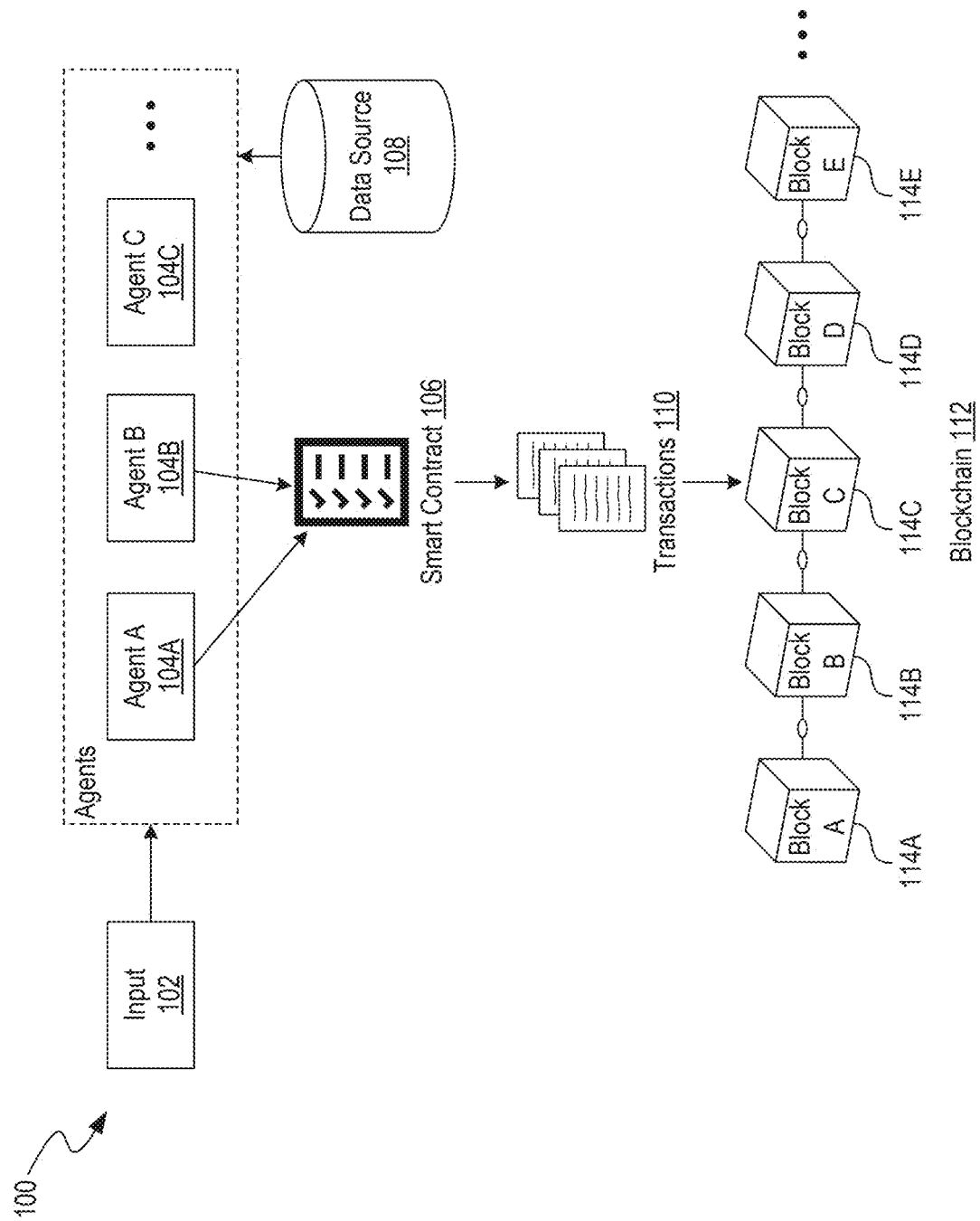
FIG. 1 illustrates an example environment of a data generation platform for automatically generating and executing computer programs using artificial intelligence (AI) models in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A smart contract is computer code that implements transactions of a contract. The computer code may be executed in a secure platform (e.g., an Ethereum platform, which provides a virtual machine) that supports recording transactions in blockchains. The computer code can define the rules and conditions under which the smart contract operates, such as the actions to be taken when certain conditions are met. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

Once the code is generated, the compiled code, along with a receiver address (the address of the smart contract on the blockchain), is included in a transaction that is transmitted to the blockchain network. When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

However, guidelines and regulations can change over time, necessitating updates to smart contracts to ensure compliance and relevance. When regulations change, the smart contract oftentimes must be updated to comply with new rules and conditions. Since smart contracts are immutable once deployed on the blockchain, to update the smart contract, conventional contract management systems typically generate a new version of the smart contract with the updated terms, and remove the old version of the smart contract from the blockchain. Conventional contract management systems generate a new transaction that includes the updated contract code. The blockchain network validates the new transaction, and the new smart contract is added to a new block in the blockchain.

To generate the new smart contract, conventional contract management systems often rely on manual intervention for decision-making (i.e., to decide what conditions are to be updated, removed, or added), which is slow, prone to errors, and lacks transparency. Conventional contract management systems typically require human agents to review and approve the terms of the smart contract, which increases the likelihood of errors in data entry, misinterpretation of contract clauses, and bias. Errors in smart contracts can be non-discoverable due to their autonomous and immutable nature. Once a smart contract is deployed on a blockchain, it executes automatically based on predefined conditions without the need for human intervention. This means any errors or bugs in the contract code will also be executed automatically, potentially leading to unintended consequences. Thus, conventional contract management systems struggle to discover and rectify errors post-deployment, as the smart contract continues to operate according to its original code. Furthermore, the decentralized nature of blockchain means there is no central authority to oversee or intervene in the contract's execution. Consequently, errors embedded in the smart contract may remain undetected. Opacity in conventional contract management systems further complicates audit trails, making it difficult for regulatory bodies and auditors to confirm compliance with applicable guidelines.

Additionally, once a smart contract is executed, conventional contract management systems struggle to ensure ongoing and continuous compliance, adapt to changing conditions, or enforce terms autonomously. Because the terms of smart contracts are manually generated, conventional contract management systems are unable to update the smart contract in response to receiving new data. For example, if a new guideline requires a term to be included in a smart contract after the creation of the smart contract, conventional contract management systems typically generate a new smart contract manually that reflects the new guideline. However, the initially generated smart contract is non-compliant until the new smart contract is generated.

Further, smart contracts executed by conventional contract management systems are typically limited to executing predefined conditions without the ability to adapt to scenarios with a high degree of complexity. In conventional contract management systems, each potential scenario that the smart contract might encounter must be anticipated and explicitly programmed, requiring significant time, computing resources, and so forth. This rigid approach means that once these scenarios are established, the smart contracts lack the flexibility to adapt to new information, evolving conditions, or unforeseen events. Consequently, the contracts are confined to executing only the predefined conditions set at the time of creation.

Attempting to create a system to manage smart contracts in view of the available conventional approaches created significant technological uncertainty. Creating such a system requires addressing several unknowns in conventional approaches to contract management, such as the difficulty in ensuring ongoing compliance and adapting to changing conditions. The static nature of smart contracts in conventional contract management systems that rely on manual oversight and predefined rules makes it challenging to adapt the smart contracts to the real-time or near real-time changes (e.g., changes in market conditions) and complexities inherent scenarios defined in smart contracts. Conventional methods, which often rely on static rule enforcement, are inadequate for managing the dynamic and evolving nature of smart contracts. Static rules may fail to anticipate the wide range of scenarios and conditions that can arise in real-time contract execution. As a result, conventional methods often fail to detect and address compliance issues or adapt to new conditions promptly, leading to potential breaches and inefficiencies.

To overcome the technological uncertainties, the inventors systematically evaluated multiple design alternatives. For example, the inventors evaluated systems that relied on periodic manual reviews of generated smart contracts to ensure compliance with contract terms. The systems included human auditors periodically checking the status of contracts and verifying that all terms are being met (e.g., that the terms are compliant with the guidelines). Additionally, the inventors evaluated systems (e.g., machine learning models) that automatically identified a degree of compliance of the smart contract with the guidelines. Each contract term was encoded as a rule, and the system checks the rules for compliance by comparing the operational boundaries of the guidelines against these rules. If a term was violated, the system flags the issue for manual intervention.

However, the manual review approach and the validation approach proved to be inflexible and difficult to maintain. The manual review approach, while thorough, was slow and resource-intensive, often resulting in delayed detection of compliance issues. The reliance on human auditors further continued to introduce the potential for human error and inconsistencies in the review process. Further, the validation approach still relied on the manual generation of updated smart contracts in the case of a non-compliant smart contract. Thus, the delay in remediating the smart contract persisted in both approaches. In response, the inventors evaluated different methods for dynamically generating and managing smart contracts. For example, the inventors explored the use of machine learning algorithms to predict and assess potential compliance issues as they occur. Additionally, the inventors evaluated a distributed approach where multiple AI-based agents (e.g., models trained on specialized datasets) continuously monitor a degree of compliance of the smart contract with the guidelines, and automatically generate further terms in the smart contract (e.g., dynamically create a new smart contract that interacts with the previous smart contract to extend its functionality or to replace the previous smart contract altogether) in response to receiving real-time or near real-time data (e.g., data associated with market conditions).

As such, the inventors have developed systems (hereinafter "data generation platform") and related methods to automatically generate and execute computer programs using decentralized artificial intelligence (AI) models. The data generation platform obtains an output generation request (e.g., from a graphical user interface (GUI)) to generate an output using an unstructured, structured, and/or semi-structured dataset. The data generation platform determines a feature set of the unstructured dataset using a first AI model set (e.g., AI-based agents), and dynamically generates a programmatic workflow set using a second AI model set (same as or different from the first AI model set) based on the feature set to be stored in a distributed database. The data generation platform automatically executes the programmatic workflow set using a third AI model set (same as or different from the first and/or second AI model sets) to generate an artifact responsive to the output generation request. In some implementations, the data generation platform displays (e.g., on the GUI) representations of the output generation request, programmatic workflow set, and/or generated artifact.

By using distributed AI-based agents, the data generation platform can validate executed actions by executing actions that have been agreed upon by the AI-based agents. For instance, a "creation" agent can generate a ticket, and a "submission" agent can be required to verify, as a condition, that the ticket was created with the specified amount, before executing the submission operation. Each agent's confidence level can be validated to be above a certain threshold. The confidence level can be determined by, for example, identifying the length of time agents spend communicating, known as the chatter index. Free-form transaction blocks in the blockchain enable flexibility in executing smart contracts without the need for extensive coding (as opposed to the manual intervention used in conventional contract management systems). For example, if a loanable value exceeds $10 million, an additional smart contract code can be executed automatically. The flexibility enables the system to adapt to various scenarios and requirements. Further, data generation platform can detect anomalies by managing groups of smart contracts, even if a specific smart contract does not have an anomaly.

By integrating smart contracts with AI models (e.g., AI-based agents), the data generation platform enables smart contracts to be executed, monitored, and enforced without manual intervention. Further, the data generation platform is enabled to adapt to real-time conditions. For example, the data generation platform evaluates near real-time or real-time data, predicts outcomes based on the data, and adapts contract execution accordingly. This real-time adaptability allows the data generation platform to respond to changing conditions and unforeseen events. Further, unlike traditional systems, the data generation platform combines the immutability and security of smart contracts with the flexibility and intelligence of AI. Each rule, along with its reasoning, timestamp, results, and/or version, can be recorded on the blockchain ledger, to create audit trail. For example, if a loan of a certain amount is provided to a client, the ledger can record an explanation of the rationale behind this decision, creating transparency and accountability.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed data generation platform can use model outputs from support vector machine (SVM), k-nearest neighbor (KNN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Data Generation Platform

FIG. 1 illustrates an example environment 100 of a data generation platform for automatically generating and executing computer programs using artificial intelligence (AI) models in accordance with some implementations of the present technology. Environment 100 includes input 102 to be input into the agents 104 (e.g., a first agent 104A, a second agent 104B, a third agent 104C), a smart contract 106 generated by the agents 104 using a data source 108, and transactions 110 to be stored on a blockchain 112 that includes blocks 114 (e.g., a first block 114A, a second block 114B, a third block 114C, a fourth block 114D, a fifth block 114E). The agents 104 are the same as or similar to the AI system 700 illustrated and described in more detail with reference to FIG. 7. The environment 100 can be implemented using components of example computer system 800 illustrated and described in more detail with reference to FIG. 8. Likewise, implementations of example environment 100 can include different and/or additional components or can be connected in different ways.

The input 102 refers to user inputs, sensory data, structured data, unstructured data, and so forth, and can include a set of instructions to generate an output using the agents 104. For instance, the input 102 can include textual data, image data, audio data, video data, multi-modal data, and so forth. For instance, textual data can include documents, emails, chat messages, and/or logs. Image data can include photographs, diagrams, scanned documents, and/or other visual representations. In some implementations, multi-modal data combines two or more data types, such as annotated images, which might include both visual data and text data in the annotations, or videos with corresponding subtitles. In some implementations, the input 102 includes a link (e.g., a URL) pointing to a knowledge base and/or a website.

The agents 104 are autonomous (or semi-autonomous) software and/or hardware entity that processes the input 102 and generates a set of actions to fulfill the user's request. For example, a first agent 104A can perform data cleaning, a second agent 104B can perform feature extraction, and so forth. In some implementations, the agents 104 are AI-based and use outputs from AI models (e.g., LLMs) and predefined objectives to autonomously generate and execute actions. The actions can be intended to fulfill specific tasks or requests made by the user, as well as other tasks or requests that are related to or associated with requests made by the user. In some implementations, actions can include tasks such as data retrieval, transaction processing, or system configuration changes. The predefined objectives of the agents 104 are the specific goals or targets that the agents 104 aim to achieve when generating the actions. The objectives can be set when constructing the agents 104 or defined by the user through input parameters. In some implementations, predefined objectives are encoded within the architecture of the agents 104. For example, when the agents 104 adopt a neural network architecture, these objectives can weigh the activations of neurons within the network to influence the decision-making process. Certain neurons can be activated to prioritize actions that ensure compliance with specific guidelines or align with specific user preferences.

The agents 104 can include a series of modules such as a natural language processing (NLP) module to interpret user inputs, a decision-making engine to determine the appropriate actions, and/or an execution module to carry out the actions on hardware or software assets. The agents 104 can have access to various databases (e.g., knowledge bases) and APIs to retrieve particular information (e.g., domain-specific information, historical data, user preferences, and so forth). Additionally, the agents 104 can operate in different modes, such as fully autonomous, semi-autonomous with human oversight, or in collaboration with other agents. In fully autonomous mode, the agents 104 can make decisions and execute actions without human intervention, relying entirely on the agents' 104 programming and/or learned behaviors. Semi-autonomous mode incorporates human oversight, allowing for manual review or approval of certain actions (e.g., in high-stakes or sensitive scenarios). The collaborative mode enables the agents 104 to work in conjunction with other agents (i.e., different agents specializing in different tasks or domains to achieve more complex objectives). For example, the agents 104 can be a specialized AI model designed for specific tasks, such as a virtual assistant, a chatbot, or an automation bot.

The agents 104 can automatically generate and/or execute the smart contract 106 based on the input 102. The smart contract 106 refers to a computational workflow (e.g., a series of computer-executable commands, a computer program, or a transaction protocol) that include rules, conditions, and/or execution logic governing the transformation of data within the data generation platform. A smart contract automatically executes, controls or documents events and actions according to the terms of the conditions. The smart contract 106 can translate variable inputs 102 into predetermined, executable commands that can subsequently be audited. The computational workflow includes instructions that dictate the operations to be performed, the order in which they should be executed, and the conditions under which certain actions should be triggered. For instance, the rules can specify that if a certain variable meets a particular threshold, a specific computational task will be initiated.

In some implementations, the data source 108 injects additional context and parameters, in addition to the input 102, used to generate the smart contract. The data source 108 can include one or more database systems, external APIs, or real-time/near real-time data feeds to ensure that the smart contracts are according to the up-to-date data. The databases can be structured (e.g., SQL databases) or unstructured (e.g., NoSQL databases). For example, a database can store historical loan repayment data, which can be retrieved to assess a risk profile of a new loan application. External APIs can be used to fetch data from third-party services. These APIs can interface with various external systems to supply real-time or near-real-time data used for the operations of smart contracts. For example, real-time or near real-time data can be used if the conditions of a smart contract 106 depend on live data. In some implementations, the data source 108 can be managed by an agent. The agent can selectively transmit data to the agents 104 to, for example, prevent the dissemination of personal data to certain agents 104.

The transactions 110 delineate one or more operations recorded as the smart contract 106 executes its computational workflow. The transactions 110 can indicate the occurrence of specific operations, such as data transformations, decision points, or events triggered within the smart contract 106, that are determined, validated, and/or stored within the blockchain 112. Each transaction can be associated with metadata that is stored along with the transaction on an immutable ledger such as the blockchain 112. The metadata can include the timestamp of the transaction, which records the date and/or time the operation occurred, the parties involved in the transaction 110, the nature of the operation (e.g., specific actions taken or conditions met), parameters or conditions that were applied during the operation, and so forth.

The blockchain 112 can include a series of blocks 114. Each block within blockchain 112 can refer to a repository for one or more transactions 110. Each block can be cryptographically linked to its predecessor to create a chain of transaction logs. Thus, any attempt to change the data within a block would require altering all subsequent blocks, making tampering computationally infeasible. Each block 114 can include a block header and a block body. The block header includes metadata about the block 114 itself, such as a unique identifier (hash) of the block 114, the hash of the previous block 114 in the chain, a timestamp providing the creation time of the block 114, and/or a nonce (e.g., a number that increases sequentially in every attempt to generate a hash). The block body can include the transactions 110 that have been validated and included in the block 114. For example, users generate transactions broadcasted to the network. Network nodes (miners or validators) can verify transactions based on set rules and criteria. the validated transactions can be bundled into a new block by a miner or validator. The miner or validator can solve a cryptographic puzzle (proof of work) and/or demonstrate ownership (proof of stake) to add the block. Once verified, the new block can be added to the blockchain 112, updating the chain across all nodes in the network.

Figure 2B:
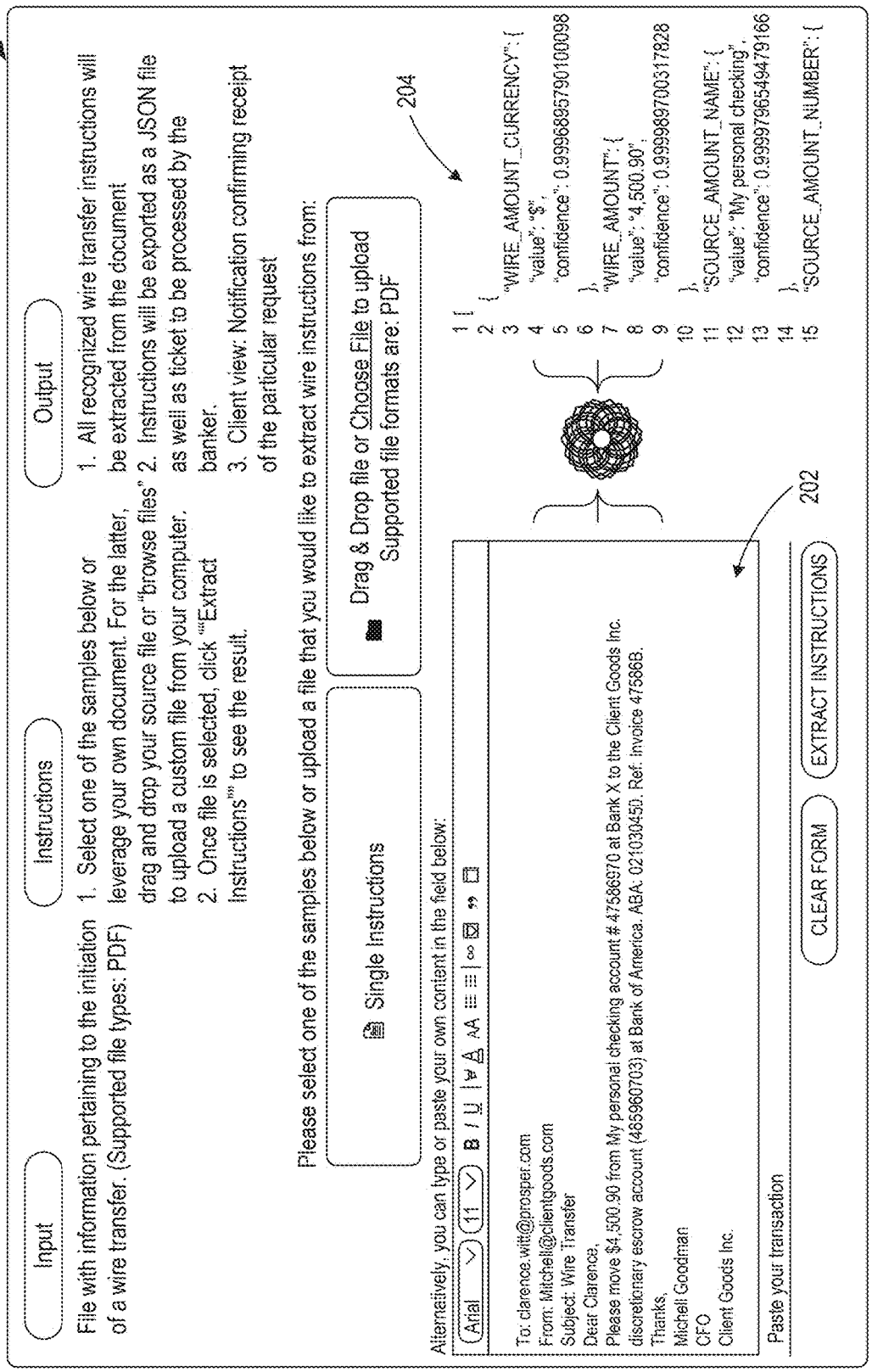
FIG. 2B is a screenshot of the user interface displaying confidence scores of features extracted from the unstructured data that is generated using a data generation platform according to some implementations of the present technology.

FIGS. 2A-2E illustrate screenshots of a user interface 200 of the data generation platform. The user interface 200 can be implemented using components of example computer system 800 illustrated and described in more detail with reference to FIG. 8. Likewise, implementations of user interface 200 can include different and/or additional components or can be connected in different ways. FIG. 2A is a screenshot of the user interface 200 illustrating uploading unstructured data 202 to a data generation platform in accordance with some implementations of the present technology. The user interface 200 enables the user to interact with the data generation platform. In the depicted user interface 200, unstructured data 202 refers to any data that lacks a predefined data model or organization, such as plain text documents, images, emails, and PDFs. For example, the user can select or upload a file, which can be in formats such as PDF, Word documents, or other formats that do not follow a structured schema. Upon selection, the interface 200 displays the chosen file to enable the user to review their input before proceeding. The sample wire transfer instruction email provided in FIG. 2A includes a request such as: "Please move $4,700.90 from My personal savings account at ABCD Bank to my checking account at XYZ Bank, account number 0987654321, routing number 123457890."

Upon receiving a user interaction (e.g., clicking the "Extract Instructions" button in FIG. 2A), the data generation platform identifies and extracts features such as wire transfer instructions, text segments, or other information in a structured format. FIG. 2B is a screenshot of the user interface 200 displaying confidence scores 204 of features extracted from the unstructured data 202 that is generated using a data generation platform according to some implementations of the present technology. For example, the user interface 200 in FIG. 2B illustrates several extracted features such as "WIRE_AMOUNT_CURRENCY," "WIRE_AMOUNT," and "SOURCE_AMOUNT_NAME," along with their corresponding values and confidence scores 204. The data generation platform generates confidence scores 204 to indicate a level of certainty regarding the accuracy of the extracted data. The confidence scores 204 can be numerical values that represent the likelihood that a particular extracted feature is accurate. For example, in FIG. 2B, the "WIRE_AMOUNT_CURRENCY" feature extracted from the unstructured data has a value of "$" with a confidence score of approximately 0.9997, and the "WIRE_AMOUNT" feature has a value of "4,700.90" with a confidence score close to 0.99999. High confidence scores 204 (e.g., confidence scores above a predefined threshold) can indicate that there is a high likelihood of the accuracy of the extracted values. Methods of generating the confidence scores 204 are discussed in further detail with reference to FIG. 9. In some implementations, the user interface 200 displays the scores alongside the extracted data.

FIG. 2C is a screenshot of the user interface 200 displaying a result 206 including the extracted features 208 according to some implementations of the present technology. The user interface 200 in FIG. 2C can display a structured output of the artifact (e.g., wire transfer request) generated by the data generation platform. In FIG. 2O, the extracted features 208 can include portions of the instructions within the unstructured data 202, such as "WIRE_AMOUNT_CURRENCY," "WIRE_AMOUNT," "SOURCE_ACCOUNT_NAME," "SOURCE_ACCOUNT_NUMBER," and so forth. The extracted features 208 can include variables and corresponding values. For example, the extracted currency "$" indicates that the transaction involves United States Dollars. Similarly, "WIRE_AMOUNT" represents the specific amount to be transferred—in the case of FIG. 2C, "4,700.90." The result 206 provides the extracted features 208 in a structured manner.

Figure 2D:
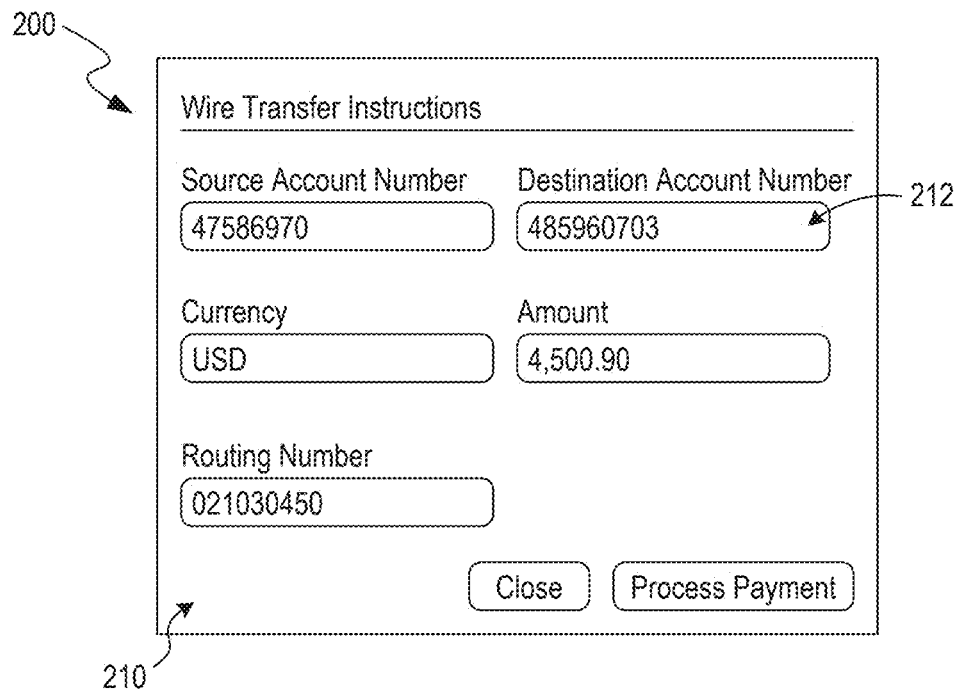
FIG. 2D is a screenshot of a first artifact generated by the data generation platform using complete unstructured data according to some implementations of the present technology.

FIG. 2D is a screenshot of an artifact 210 generated by the data generation platform using complete unstructured data 212 according to some implementations of the present technology. In FIG. 2D, the data generation platform has generated detailed wire transfer instructions, including the source account number, destination account number, currency type, amount to be transferred, and the routing number. In some implementations, the artifact 210 can be generated by an AI-based agent that is different from the AI-based agent that extracted the features from the unstructured data 202. The artifact 210 refers to the structured output generated by the data generation platform from the complete unstructured data 212. For example, the artifact 210 displays wire transfer details extracted from the unstructured data, which includes: the source account number (47586970), the destination account number (485960703), the currency (USD), the amount (4,700.90), and the routing number (021030450). The user interface 200 can display the artifact 210 and enable users to modify the artifact 210 before executing the computational workflow indicated by the artifact (e.g., before submitting the wire transfer request). In some implementations, the data generation platform can use one or more AI models (e.g., an AI-based agent) to automatically execute the computer-executable commands associated with the artifact 210 (e.g., automatically processing the wire transfer request).

Figure 2E:
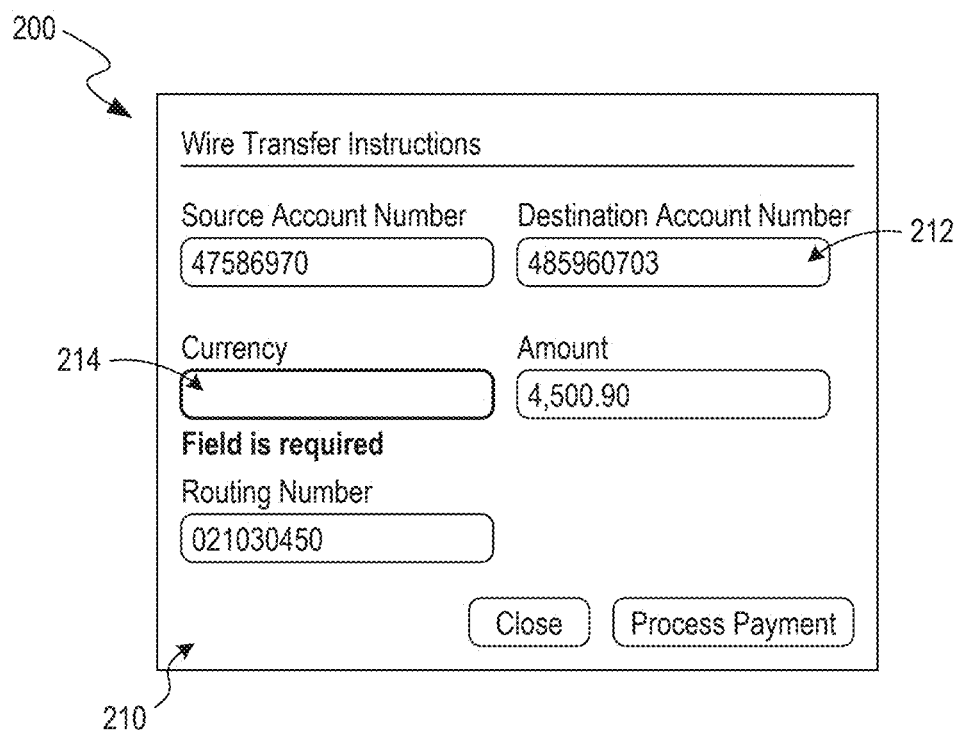
FIG. 2E is a screenshot of a second artifact generated by the data platform using incomplete unstructured data according to some generation implementations of the present technology.

Before automatically executing the computer-executable commands, the AI-based agent can first validate that the artifact 210 created by, for example, a different AI-based agent, includes complete information (e.g., validating that the unstructured data 202 is complete). In some implementations, when the unstructured data 202 is incomplete, the data generation platform flags and/or alerts the user of the incomplete data. FIG. 2E is a screenshot of the artifact 210 generated by the data generation platform using incomplete unstructured data 214 according to some implementations of the present technology. The artifact 210 displays wire transfer instructions including the source account number (47586970), destination account number (485960703), transfer amount (4,700.90), and routing number (021030450). However, the currency type field is blank due to the incomplete unstructured data 214.

Figure 3:
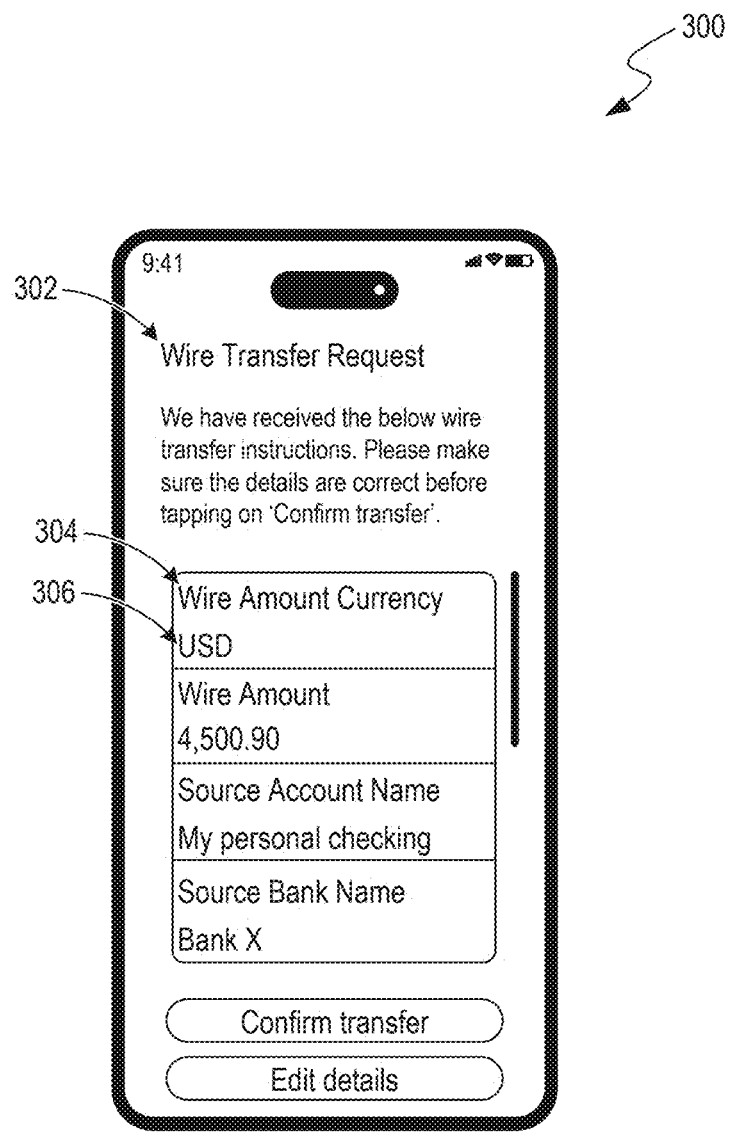
FIG. 3 is a screenshot displaying the artifact generated by the data generation platform on a user interface according to some implementations of the present technology.

FIG. 3 is a screenshot 300 displaying the artifact 302 generated by the data generation platform on a user interface according to some implementations of the present technology. The artifact 302 can include one or more variables 304 and corresponding values 306 extracted from the unstructured data. The screenshot 300 can be implemented using components of example computer system 800 illustrated and described in more detail with reference to FIG. 8. Likewise, implementations of the screenshot 300 can include different and/or additional components or can be connected in different ways.

The screenshot 300 displays the generated artifact 302. The artifact 302 can include the set of variables 304. Variables 304 represent the data fields extracted from the unstructured dataset. In the screenshot 300, the variables 304 include the currency, amount, source account name, source account number, destination account name, destination account number, and routing number. Each variable can correspond to information used to process the wire transfer. For instance, the variable indicating the currency is denoted as "USD," specifies the currency in which the transfer is to be executed.

Corresponding values 306 denote the specific data points associated with each variable 304. Corresponding values 306 can be extracted from the unstructured dataset and populated into their respective fields within the artifact 302. For example, the currency variable holds the value "USD," the transfer amount variable holds the value "4,700.90," the source account name holds the value "My personal checking," and so forth. In some implementations, the data generation platform can display additional metadata such as the confidence reliability or historical usage patterns associated with the extracted variables 304. Interactive buttons within the interface, such as "Close" and "Process Payment," can enable users to trigger or modify the computational workflow. In some implementations, the data generation platform automatically triggers the computational workflow.

Example Methods of Using the Data Generation Platform

Figure 4:
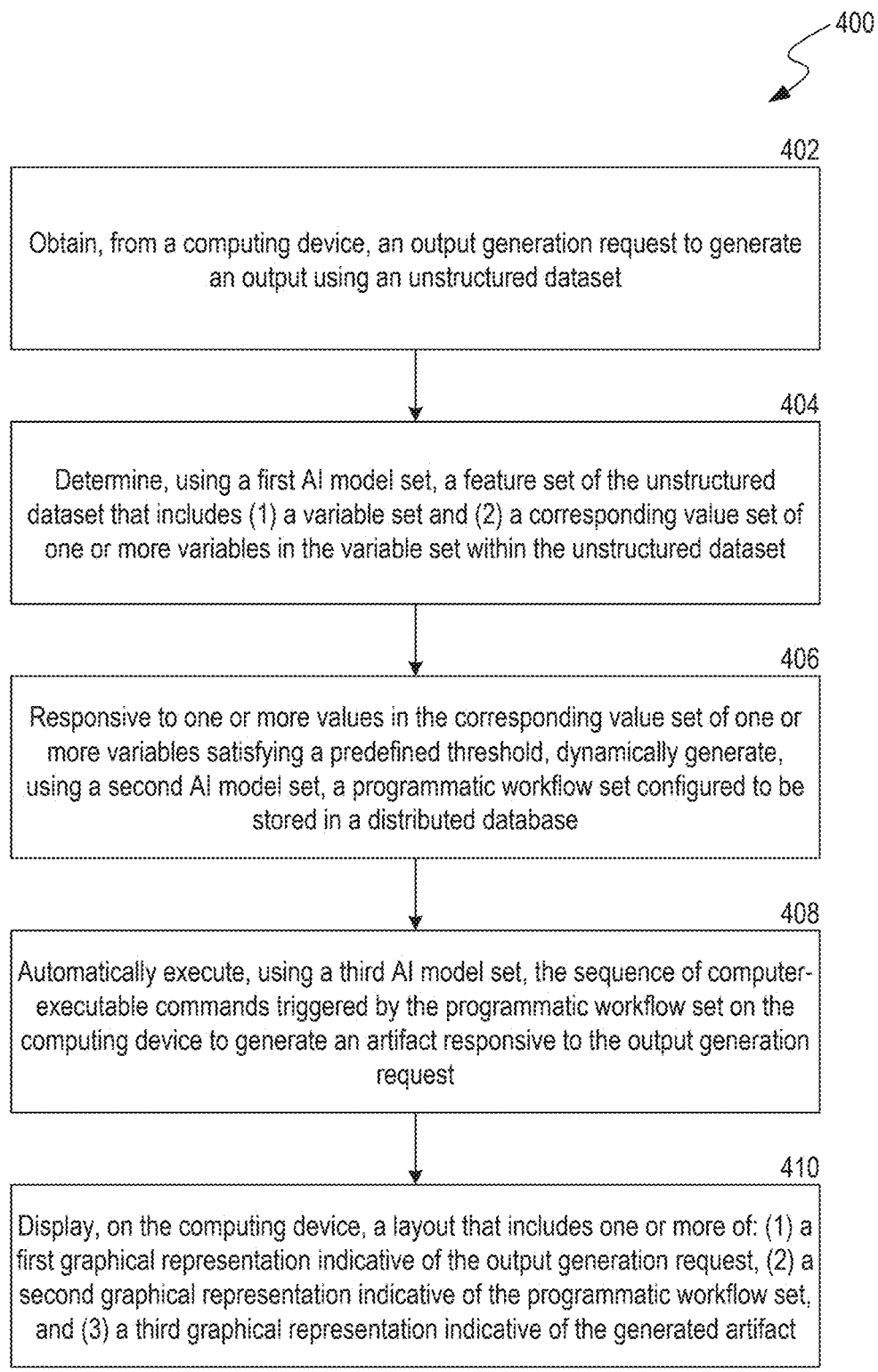
FIG. 4 is a flow diagram illustrating an example process of generating and executing computer programs using a data generation platform according to some implementations of the present technology.

FIG. 4 is a flow diagram illustrating an example process 400 of generating and executing computer programs using a data generation platform according to some implementations of the present technology. In some implementations, the process 400 is performed by a computer system, e.g., example computer system 800 illustrated and described in more detail with reference to FIG. 8. Implementations can include different and/or additional steps or can perform the steps in different orders.

In operation 402, the data generation platform obtains (e.g., receives from a graphical user interface (GUI) of a computing device) an output generation request (e.g., a wire request) to generate an output using an unstructured dataset. The requested output can satisfy a guideline set defining an operative boundary set of the output generation request. In some implementations, the data generation platform establishes a communication channel with the GUI of the computing device. For example, the GUI can transmit a request to the data generation platform's server endpoint. The request can include metadata defining the output generation request, such as the type of output required, specific parameters, and/or the dataset to be used.

In operation 404, the data generation platform determines, using a first AI model set, a feature set of the unstructured dataset that includes a variable set and/or a corresponding value set of each variable in the variable set within the unstructured dataset. For text data, the data generation platform can tokenize the text into words or subwords, and convert these tokens into numerical representations using methods such as word embeddings (e.g., Word2Vec, GloVe) or contextual embeddings (e.g., BERT embeddings). The first AI model set can identify variables such as named entities, parts of speech, and/or syntactic dependencies, and assign corresponding values to the variables based on the context within the text. For example, the data generation platform can identify features (e.g., variables) such as named entities (e.g., people, organizations, locations), parts of speech (e.g., nouns, verbs, adjectives), and syntactic dependencies (e.g., subject, object relationships). For instance, in the sentence "The quick brown fox jumps over the lazy dog," the model identifies "fox" and "dog" as nouns, "jumps" as a verb, and "quick" and "lazy" as adjectives.

For image data, the AI model set can use a model such as a CNN to identify features including edges, textures, shapes, and/or higher-level patterns. The model can identify variables and assign corresponding values to these variables based on the detected features within the images. For instance, in an image of a cat, the model can first detect edges that form the outline of the cat, and then identify textures such as fur, and subsequently identify the overall shape and specific features such as eyes and ears. The model can assign variables such as object classes (e.g., cat, dog), bounding box coordinates (e.g., the position of the cat in the image), and pixel intensities (e.g., color values).

For audio data, the AI model set can convert the raw audio signals into spectrograms or other time-frequency representations. The model can extract features such as pitch (frequency of the sound), timbre (quality of the sound), and/or rhythm (timing patterns). For example, in a piece of music, the model can identify the pitch of each note, the sound characteristics of different instruments, and so forth. Variables such as frequency bands (e.g., low, mid, high frequencies), amplitude levels (e.g., loudness), and temporal patterns (e.g., beats per minute) can be identified and assigned corresponding values.

The data generation platform can generate confidence scores for each feature of the feature set and compare the confidence score to a particular threshold. Each feature included in the feature set can satisfy the particular threshold. In some implementations, confidence scores can be generated (e.g., agents 104) based on a chatter index, or an indication of the amount of time agent spent communicating with another system. For text data, the data generation platform can use NLP models to assign confidence scores to features such as named entities, parts of speech, and/or syntactic dependencies. For example, if the model identifies "New York" as a location in a sentence, the model generates a confidence score indicating how certain it is that "New York" is a location. The confidence score can be based on the context in which the term appears and calculated by converting the model's raw output into a probabilities that sum to one. The resulting probability for each term indicates the model's confidence in its prediction, with higher probabilities reflecting greater confidence.

For image data, CNNs can be used to assign confidence scores to features such as object classes, bounding box coordinates, and/or pixel intensities. For instance, if the model detects a cat in an image, the model generates a confidence score reflecting the likelihood that the detected object is a cat. The confidence score can be derived from the activation levels of the neurons in the final layers of the CNN, which indicate the model's certainty about the classification. The confidence score can be typically a value between 0 and 1, where higher values indicate greater confidence. For audio data, the data generation platform can use spectrograms to assign confidence scores to features such as pitch, timbre, and/pr rhythm. For example, if the model identifies a specific musical note, the model generates a confidence score indicating how certain it is about the note's pitch. The confidence score can be calculated based on the probability of the feature given the observed data.

Once the confidence scores are generated, the data generation platform can compare each score to a predefined threshold. This threshold can be set based on the desired level of certainty for the features to be considered valid. The data generation platform can iterate through each feature and its corresponding confidence score, checking if the score meets or exceeds the threshold.

Responsive to one or more values in the corresponding value set of each variable satisfying a predefined threshold, in operation 406, the data generation platform dynamically generates, using a second AI model set (same as or different from the first AI model set), a programmatic workflow set (e.g., a smart contract) configured to be stored in a distributed database (e.g., a blockchain network) by mapping a vector representation of each feature of the feature set to an antecedent set (e.g., conditional statements) representative of the feature, a corresponding programmatic workflow of the programmatic workflow set satisfying the operative boundary set of the guideline set, and/or one or more nodes of the distributed database (e.g., blocks on a blockchain network). For example, the data generation platform can determine that if a loanable value within the output generation request is greater than $10 million, the data generation platform automatically generates additional smart contract code to be executed on the computing device.

The antecedent set can include conditional statements that represent the logical conditions and rules associated with each feature. For example, if the feature is a loanable value, the antecedent set can include conditions such as "if loanable value >$10 million." The data generation platform can use these conditional statements to construct the programmatic workflow. The programmatic workflow can be a sequence of programmatic instructions or code that defines the actions to be taken based on the conditions specified in the antecedent set. In the case of a smart contract, the programmatic workflow can include the logic and rules that govern the execution of the contract. For example, the programmatic workflow can specify that if the loanable value exceeds $10 million, additional clauses or conditions are added to the smart contract.

To ensure that the generated programmatic workflow satisfies the operative boundary set of the guideline set, the data generation platform can cross-reference the workflow with the predefined guidelines. Once the programmatic workflow is generated and validated, the data generation platform can store the programmatic workflow in a distributed database, such as a blockchain network. In some implementations, the corresponding programmatic workflow triggers a sequence of computer-executable commands responsive to satisfying the antecedent set. For example, if the data generation platform determines that a loanable value within the output generation request is greater than $10 million, the data generation platform automatically generates additional smart contract code to handle this condition. This code is stored on the blockchain, where it can be executed by the computing device when the specified conditions are met.

Each node of the one or more nodes can be assigned a unique cryptographic hash by applying a particular hash function on the node. The one or more nodes can each be linked to a corresponding unique cryptographic hash of a different node in the distributed database. The hash function uses the data contained within the node as input to generate a fixed-size string of characters, which is the cryptographic hash. This hash uniquely represents the data in the node, ensuring that changes in the node's data results in a different hash. The data generation platform applies the hash function to the data of each node. The data generation platform links each node to a corresponding unique cryptographic hash of a different node in the distributed database. For example, the data generation platform can link the hash of the previous node in the data of the current node before applying the hash function. For instance, if Node A is followed by Node B, the data of Node B can include the hash of Node A. When the hash function is applied to Node B, it generates a hash that includes the hash of Node A, creating a cryptographic link between the two nodes. Thus, if any data in a node is altered, the hash of that node will change, which will also affect the hashes of all subsequent nodes.

To generate the smart contract based on previous similar contracts, in some implementations, the data generation platform generates a similarity score between the feature set and a plurality of historical feature sets by determining a degree of similarity between vector representations of one or more features within the feature set with vector representations of one or more historical features of the historical feature set. Similarity measures can include cosine similarity, Euclidean distance, or other metrics that quantify how close the vectors are to each other in the high-dimensional space. For example, cosine similarity measures the cosine of the angle between two vectors, with values closer to 1 indicating higher similarity. The data generation platform can generate the programmatic workflow set using a historical programmatic workflow set associated with a historical feature set that has a highest similarity score with the feature set.

In operation 408, the data generation platform automatically executes, using a third AI model set (same as or different from the first and second AI model sets), the sequence of computer-executable commands triggered by the programmatic workflow set on the computing device to generate an artifact (e.g., a wire transfer ticket) responsive to the output generation request. Each command can be processed in order. As the data generation platform executes each command, the data generation platform can dynamically update the state of the computing device and the data being used.

In operation 410, the data generation platform displays, on the GUI of the computing device, a graphical layout that includes a first graphical representation indicative of the output generation request, a second graphical representation indicative of the programmatic workflow set, and/or a third graphical representation indicative of the generated artifact. The first, second, and/or third graphical representation can include a preview of the content, such as an embedded PDF viewer, a link, or an image viewer, or can include the entirety of the content.

To keep track of who accessed which data and/or executed which contracts, in some implementations, the data generation platform, responsive to the execution of the sequence of the computer-executable commands, stores an indication of the execution in the distributed database. The indication can be linked to the one or more nodes of the distributed database. The data generation platform can capture information associated with execution (e.g., execution metadata) of the computer-executable commands, such as the identity of the user or system that initiated the execution, the specific commands that were executed, the time and date of execution, data used by the commands, and so forth. Once the execution metadata is collected, the data generation platform can format the metadata into a structured record such as one that includes fields for the information, such as user ID, command details, timestamp, and so forth. The data generation platform can generate a unique identifier for the execution record. The identifier can be a cryptographic hash to ensure the immutability of the execution record, as changes to the metadata would result in a different hash.

The data generation platform can create a new node in the distributed database to store the execution record. The node can include the execution metadata and the generated hash value. The node can be linked to the relevant nodes in the distributed database, such as the nodes representing the data accessed or the contracts executed, by including references to the unique cryptographic hashes of the related nodes within the new node. To store the new node in the distributed database, the data generation platform can initiate a transaction on the blockchain network.

To maintain auditability, in some implementations, each programmatic workflow of the programmatic workflow set is associated with an explanation associated with the antecedent set and/or the sequence of computer-executable commands, a timestamp, and/or a version identifier. The explanation associated with the antecedent set and the sequence of computer-executable commands can be a human-readable description of the logic and conditions associated with the programmatic workflow. For example, if the workflow includes a conditional statement such as "if loanable value >$10 million," the explanation can describe the condition and/or its corresponding consequent. The explanations can be stored as text strings and can be included in the metadata for each workflow.

The data generation platform can record a timestamp for each workflow using the system clock and include the timestamp in the metadata to provide a chronological record of the workflow's history. The data generation platform can assign, in some implementations, a version identifier to each workflow. This identifier can be a unique string or number that distinguishes different versions of the workflow. Each time the workflow is updated or modified, the data generation platform can increment or otherwise modify the version identifier to reflect the changes. The version identifier enables users and auditors to track the evolution of the workflow over time and to reference specific versions when needed. Once the metadata is generated, the data generation platform can associate it with the corresponding programmatic workflow in the structured record. The data generation platform can store the metadata record alongside the workflow in the distributed database.

Figure 5:
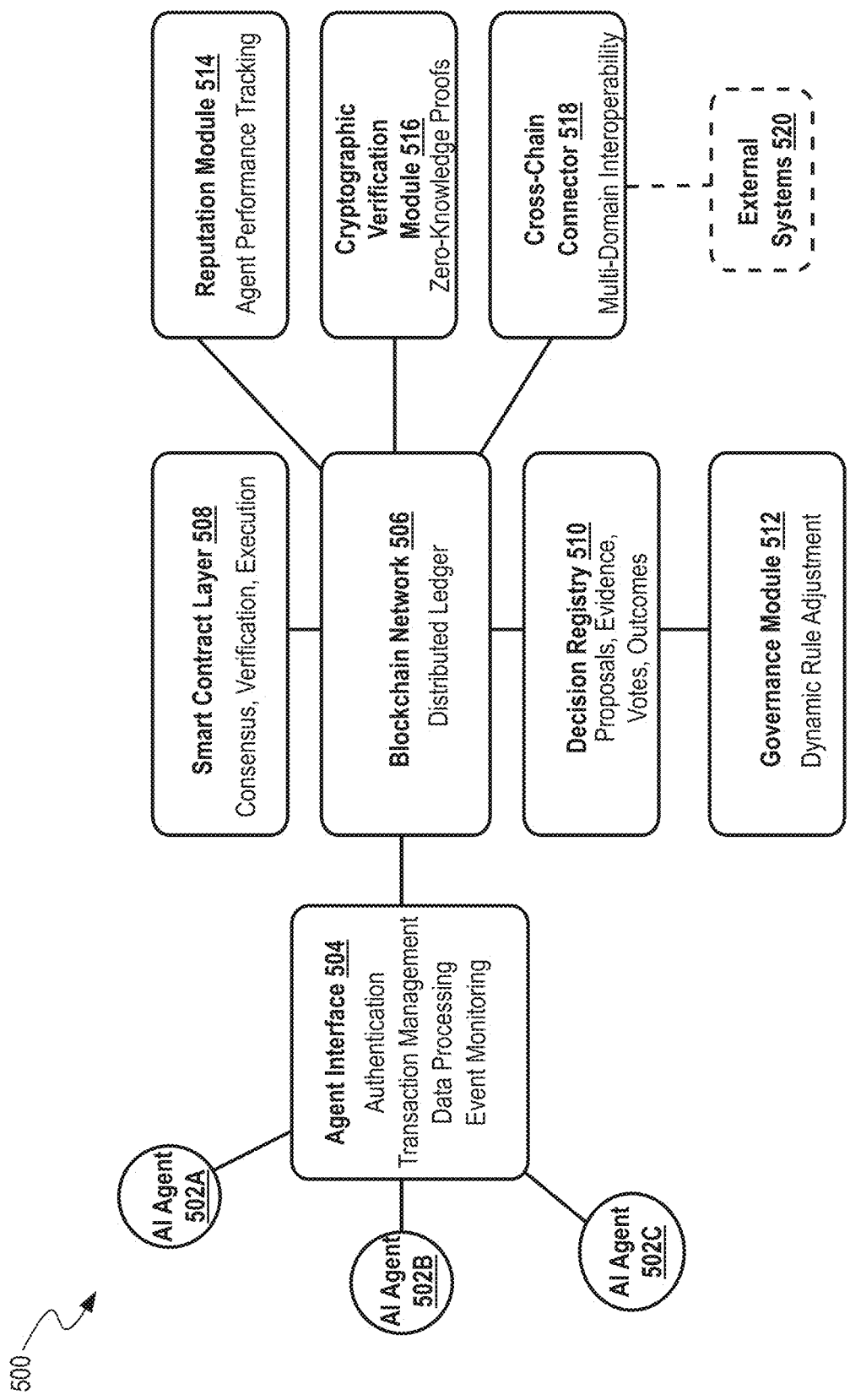
FIG. 5 illustrates an example environment of blockchain-based decision making for AI agent(s) using the data generation platform in accordance with some implementations of the present technology.

FIG. 5 illustrates an example environment 500 of blockchain-based decision making for AI agent(s) using the data generation platform in accordance with some implementations of the present technology. Environment 500 includes AI agents 502, an agent interface 504, a blockchain network 506, a smart contract layer 508, a decision registry 510, a governance module 512, a reputation module 514, a cryptographic verification module 516, a cross-chain connector 518, and external systems 520. The AI agents 502 are the same as or similar to the AI system 700 illustrated and described in more detail with reference to FIG. 7. The environment 500 can be implemented using components of example computer system 800 illustrated and described in more detail with reference to FIG. 8. Likewise, implementations of example environment 500 can include different and/or additional components or can be connected in different ways.

The environment 500 includes multiple AI agents 502, such as a first AI agent 502A, a second AI agent 502B, a third AI agent 502C, and so forth. These AI agents 502 can be specialized for different tasks or domains (i.e., trained on domain-specific data). The AI agents 502 interact with the system through an agent interface 504, which provides a standardized communication protocol to manage the agents' interactions with other components of the data generation platform. The agent interface 504 can include modules to perform, for example, authentication, transaction formatting, data encryption/decryption, and/or communication with other system components. Examples and methods of operating the agent interface 504 are further discussed with reference to FIG. 6 below.

The blockchain network 506 refers to a distributed and immutable ledger for recording transactions and decisions. The blockchain network 506 can use consensus mechanisms such as multiple rounds of communication between nodes to validate transactions, propose new blocks, and/or reach agreement on the state of the ledger. By ensuring that all participating nodes agree on the state of the blockchain, the data generation platform can provide a reliable and tamper-resistant foundation for recording and executing decisions made by the AI agents. In some implementations, the blockchain network 506 can be implemented as a private, permissioned network to control access and refine the management of AI agent interactions. The smart contract layer 508 is communicatively connected to the blockchain network 506, and can include pre-programmed rules and conditions that govern the execution of transactions. The smart contract layer 508 can include consensus protocols that define voting mechanisms and/or thresholds for different decision types, verification contracts that validate agent credentials and/or contributions, execution contracts that trigger actions based on decision outcomes, and so forth.

Records of decisions made by the AI agents, including proposals, evidence, votes, and/or outcomes can be stored and/or managed by the decision registry 510. The decision registry 510, for example, can be structured as a structured database within the blockchain. The governance module 512 can be used to enforce rules and policies within the data generation platform. In some implementations the governance module 512 is enabled to dynamically adjust parameters of one or more rules (e.g., smart contracts) based on predefined criteria or collective decisions by the AI agents 502. To provide reliability and effectiveness of the AI agents, the reputation module 514 is enabled to track and evaluate the performance and/or assign a degree of reliability to individual AI agents 502 based on, for example, previous actions and decisions. The reputation scores maintained by the reputation module 514 can influence the weight given to each agent's input in collective decision-making processes.

To ensure the security of the data generation platform, the cryptographic verification module 516 can perform one or more cryptographic techniques such as zero-knowledge proofs to verify transactions, agent reasoning, and/or decisions without revealing sensitive information. To facilitate interoperability with other blockchain networks or external systems, the cross-chain connector 518 enables the exchange of data and execution of transactions across different blockchain networks to expand the capabilities of the data generation platform. The cross-chain connector 518 can enable interoperability with other blockchain networks for decisions that span multiple domains. The cross-chain connector 518 can interface with external systems 520 to enable the integration of external data sources, services, or applications into the decision-making process.

Figure 6:
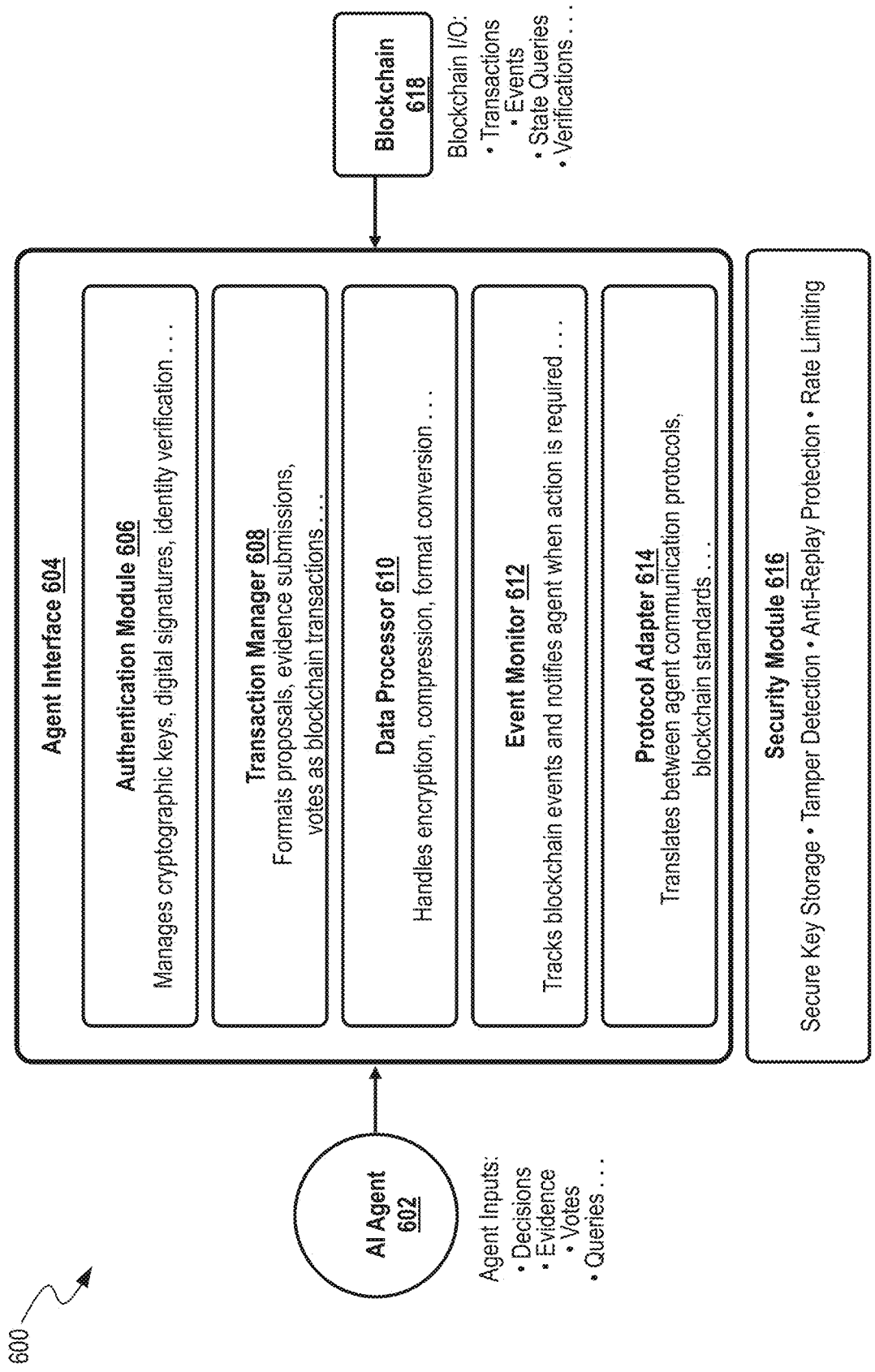
FIG. 6 illustrates an example environment of an interface of an AI agent used within a data generation platform in accordance with some implementations of the present technology.

FIG. 6 illustrates an example environment 600 of an interface of an AI agent used within a data generation platform in accordance with some implementations of the present technology. Environment 600 includes an AI agent 602 (e.g., the AI agents 502 in FIG. 5) and an agent interface 604 (e.g., the agent interface 504 in FIG. 5) that includes an authentication module 606, a transaction manager 608, a data processor 610, an event monitor 612, and a protocol adapter 614. The environment 600 further includes a security module 616 and a blockchain 618. The AI agent 602 are the same as or similar to the AI system 700 illustrated and described in more detail with reference to FIG. 7. The environment 600 can be implemented using components of example computer system 800 illustrated and described in more detail with reference to FIG. 8. Likewise, implementations of example environment 600 can include different and/or additional components or can be connected in different ways.

The AI agent 602 interacts with the blockchain network through the agent interface 604. When the AI agent 602 generates a decision, evidence, action, vote, query, and so forth (e.g., based on the agent's internal algorithms, which can include machine learning models, rule-based systems, or other decision-making mechanisms), it can trigger a series of processes within the agent interface 604 to interact with the blockchain 618 (e.g., transactions, events, state queries, verifications, and so forth). Within the agent interface 604, the authentication module 606 can verify the AI agent's identity and permissions within the data generation platform. The authentication module 606 can use one or more cryptographic techniques such as digital signatures or multi-factor authentication to ensure that only authorized agents are enabled to participate in the decision-making process. For example, the data generation platform can generate a digital signature using the agent's private key, which can be verified by other participants in the network. In another example, the data generation platform can validate the agent's current status and permissions against a predefined set of criteria implemented on the blockchain.

Once authenticated, the transaction manager 608 formats the decision or action into a blockchain transaction. The transaction manager 608 can structure the data according to the specific criteria of the blockchain protocol, such as including metadata, timestamps, and transaction identifiers. In some implementations, the transaction manager 608 can sequence and prioritize transactions within the blockchain 618. The data processor 610 can be used to encrypt, compress, and/or otherwise format the conversion of data exchanged between the AI agent 602 and the blockchain 618. In some implementations, the data processor 610 can use advanced techniques such as zero-knowledge proofs to enable verification of certain properties of the data without revealing the data itself. Throughout the operation of the data generation platform, the event monitor 612 can track events occurring on the blockchain 618. The event monitor 612 can filter blockchain 618 events and notify the AI agent when action is required or when relevant information becomes available.

The protocol adapter 614 can be used as a translation layer between the communication protocols used by the AI agent and those used by the blockchain network. The protocol adapter 614 enables interoperability between different AI systems and blockchain platforms. For example, the protocol adapter 614 can translate between different data serialization formats, adjust byte orders, or implement any blockchain-specific cryptographic operations used for transaction submission. Before the transaction is submitted to the blockchain 618, the security module 616 can apply one or more security measures such as performing an encryption of the transaction payload, implementing anti-replay protection by including nonces or timestamps, applying rate limiting to prevent potential denial-of-service attacks on the blockchain network, and so forth.

Example Implementation of the Models of the Data Generation Platform

Figure 7:
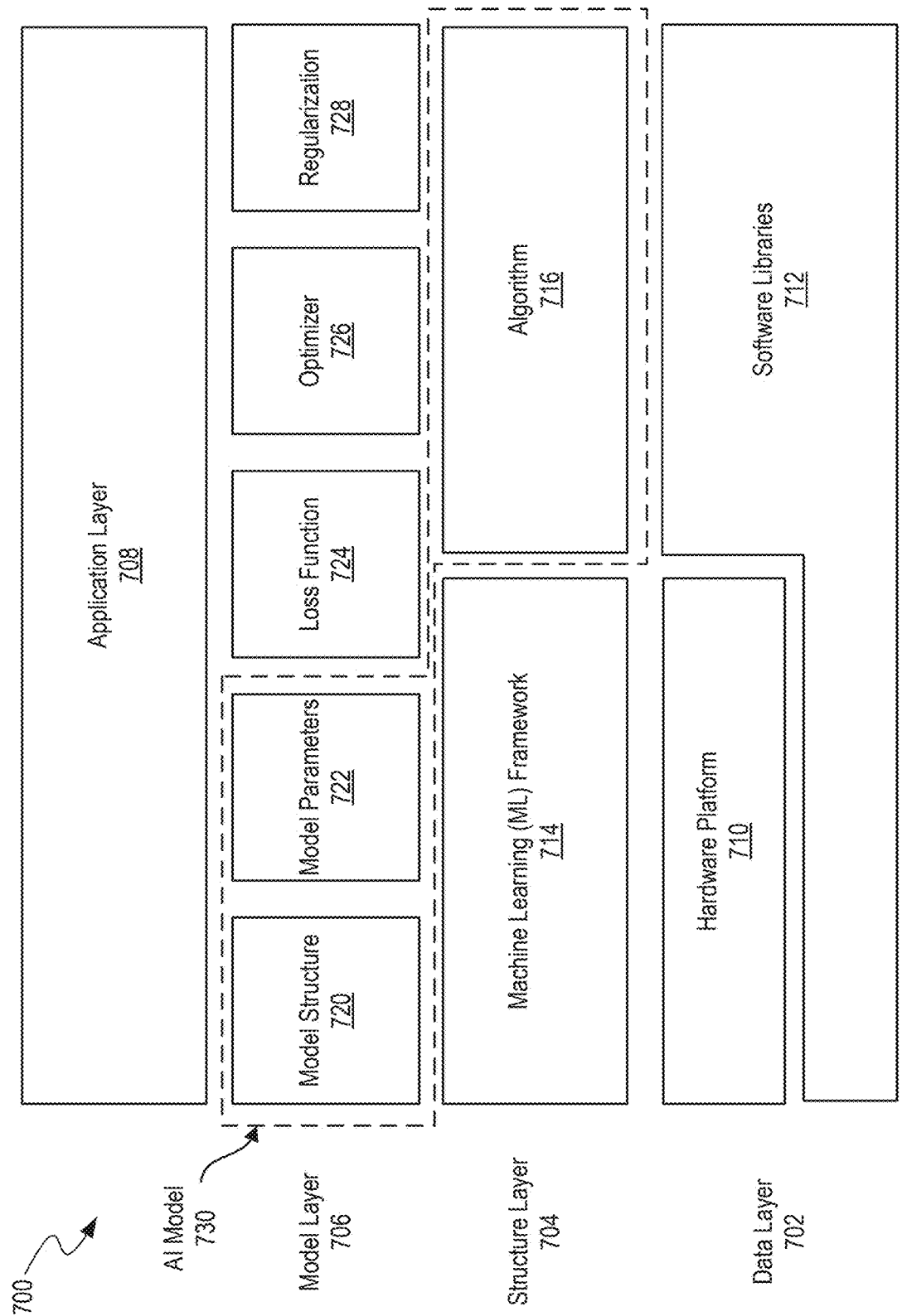
FIG. 7 illustrates a layered architecture of an AI system that can implement the machine learning models of a data generation platform, in accordance with some implementations of the present technology.

FIG. 7 illustrates a layered architecture of an AI system 700 that can implement the ML models of the data generation platform of FIG. 1, in accordance with some implementations of the present technology. Example ML models can include the models executed by the data generation platform, such as agents 104. Accordingly, the agents 104 can include one or more components of the AI system 700.

As shown, the AI system 700 can include a set of layers, which conceptually organize elements within an example network topology for the AI system's architecture to implement a particular AI model. Generally, an AI model is a computer-executable program implemented by the AI system 700 that analyses data to make predictions. Information can pass through each layer of the AI system 700 to generate outputs for the AI model. The layers can include a data layer 702, a structure layer 704, a model layer 706, and an application layer 708. The algorithm 716 of the structure layer 704 and the model structure 720 and model parameters 722 of the model layer 706 together form an example AI model. The optimizer 726, loss function engine 724, and regularization engine 728 work to refine and optimize the AI model, and the data layer 702 provides resources and support for application of the AI model by the application layer 708.

The data layer 702 acts as the foundation of the AI system 700 by preparing data for the AI model. As shown, the data layer 702 can include two sub-layers: a hardware platform 710 and one or more software libraries 712. The hardware platform 710 can be designed to perform operations for the AI model and include computing resources for storage, memory, logic and networking, such as the resources described in relation to FIGS. 8 and 6. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include computing resources, (e.g., servers, memory, etc.) offered by a cloud services provider. The hardware platform 710 can also include computer memory for storing data about the AI model, application of the AI model, and training data for the AI model. The computer memory can be a form of random-access memory (RAM), such as dynamic RAM, static RAM, and non-volatile RAM.

The software libraries 712 can be thought of suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, enabling them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that enables users to build and deploy the AI model. The ML framework 714 can include an open-source library, an API, a gradient-boosting library, an ensemble method, and/or a deep learning toolkit that work with the layers of the AI system facilitate development of the AI model. For example, the ML framework 714 can distribute processes for application or training of the AI model across multiple resources in the hardware platform 710. The ML framework 714 can also include a set of pre-built components that have the functionality to implement and train the AI model and enable users to use pre-built functions and classes to construct and train the AI model. Thus, the ML framework 714 can be used to facilitate data engineering, development, hyperparameter tuning, testing, and training for the AI model. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that enables the computing resources to learn from new input data and create new/modified outputs based on what was learned. In some implementations, the algorithm 716 can build the AI model through being trained while running computing resources of the hardware platform 710. This training enables the algorithm 716 to make predictions or decisions without being explicitly programmed to do so. Once trained, the algorithm 716 can run at the computing resources as part of the AI model to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of input 102 in FIG. 1) from various source computing systems described in relation to FIG. 1. Furthermore, training data can include pre-processed data generated by various engines of the data generation platform described in relation to FIG. 1. The user may label the training data based on one or more classes and trains the AI model by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can include classification and/or regression. Classification techniques include teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The data generation platform can use unsupervised learning to identify patterns in claim history (e.g., to identify particular event sequences) and so forth. In some implementations, performance of the data generation platform that can use unsupervised learning is improved because the incoming input 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model of the AI system 700. The model structure 720 defines the complexity of the pattern/relationship that the AI model expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model and the actual output of the AI model and is used to guide optimization of the AI model during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 702.

The regularization engine 728 executes regularization operations. Regularization is a technique that prevents over- and under-fitting of the AI model. Overfitting occurs when the algorithm 716 is overly complex and too adapted to the training data, which can result in poor performance of the AI model. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constraint the resulting AI model and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can include a front-end user interface of the data generation platform.

Example Computing Environment of the Data Generation Platform

Figure 8:
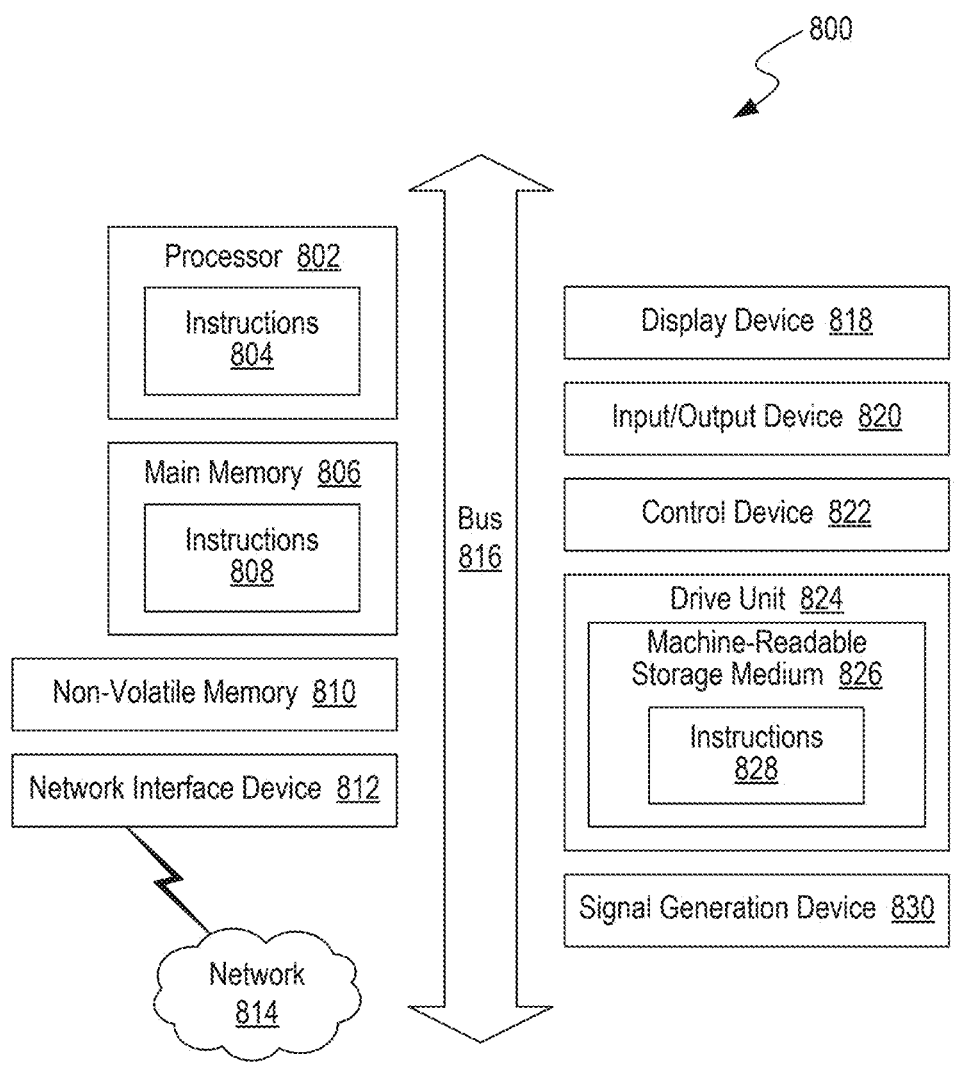
FIG. 8 is a block diagram showing some of the components typically incorporated in at least some of the computer systems and other devices on which the data generation platform operates in accordance with some implementations of the present technology.

FIG. 8 is a block diagram showing some of the components typically incorporated in at least some of the computer systems and other devices 800 on which the disclosed system operates in accordance with some implementations of the present technology. As shown, an example computer system 800 can include: one or more processors 802, main memory 808, non-volatile memory 812, a network interface device 814, video display device 820, an input/output device 822, a control device 824 (e.g., keyboard and pointing device), a drive unit 826 that includes a machine-readable medium 828, and a signal generation device 832 that are communicatively connected to a bus 818. The bus 818 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real time, near real time, or in batch mode.

The network interface device 814 enables the computer system 800 to exchange data in a network 816 with an entity that is external to the computing system 800 through any communication protocol supported by the computer system 800 and the external entity. Examples of the network interface device 814 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 808, non-volatile memory 812, machine-readable medium 828) can be local, remote, or distributed. Although shown as a single medium, the machine-readable medium 828 can include multiple media (e.g., a centralized/distributed database and/or associated caches and servers) that store one or more sets of instructions 830. The machine-readable (storage) medium 828 can include any medium that is capable of storing, encoding, or carrying a set of instructions for execution by the computer system 800. The machine-readable medium 828 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 810, 830) set at various times in various memory and storage devices in computing device(s). When read and executed by the processor 802, the instruction(s) cause the computer system 800 to perform operations to execute elements involving the various aspects of the disclosure.

Figure 9:
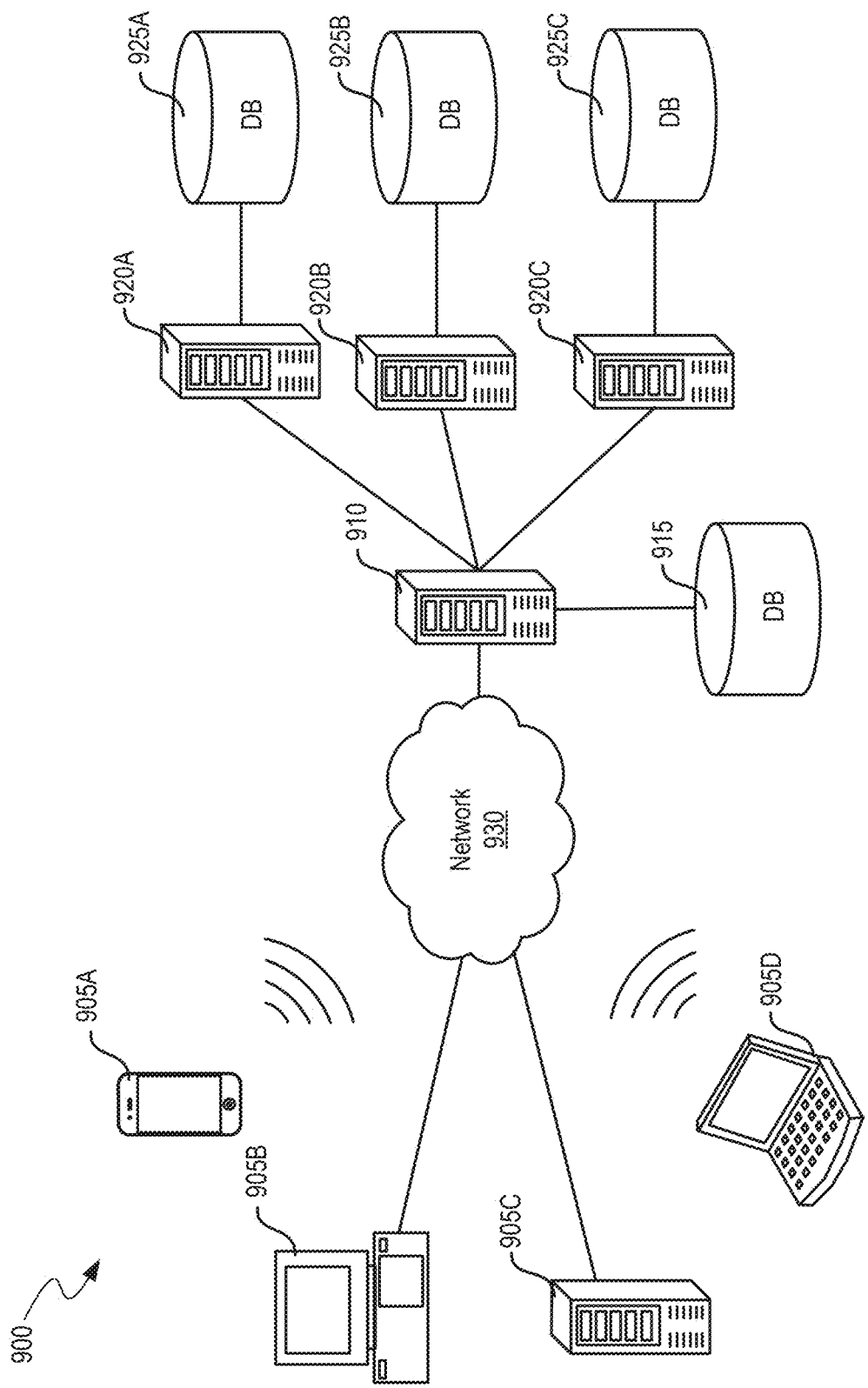
FIG. 9 is a system diagram illustrating an example of a computing environment in which the data generation platform operates in some implementations of the present technology.

FIG. 9 is a system diagram illustrating an example of a computing environment in which the disclosed system operates in some implementations. In some implementations, environment 900 includes one or more client computing devices 605A-D, examples of which can host the data generation platform of FIG. 1. Client computing devices 905 operate in a networked environment using logical connections through network 930 to one or more remote computers, such as a server computing device.

In some implementations, server 910 is an edge server which receives client requests and coordinates fulfillment of those requests through other servers, such as servers 820A-C. In some implementations, server computing devices 910 and 920 comprise computing systems, such as the data generation platform of FIG. 1. Though each server computing device 910 and 920 is displayed logically as a single server, server computing devices can each be a distributed computing environment encompassing multiple computing devices located at the same or at geographically disparate physical locations. In some implementations, each server 920 corresponds to a group of servers.

Client computing devices 905 and server computing devices 910 and 920 can each act as a server or client to other server or client devices. In some implementations, servers (910, 820A-C) connect to a corresponding database (915, 825A-C). As discussed above, each server 920 can correspond to a group of servers, and each of these servers can share a database or can have its own database. Databases 915 and 925 warehouse (e.g., store) information such as claims data, email data, call transcripts, call logs, policy data and so on. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. In some implementations, network 930 is the Internet or some other public or private network. Client computing devices 905 are connected to network 930 through a network interface, such as by wired or wireless communication. While the connections between server 910 and servers 920 are shown as separate connections, these connections can be any kind of local, wide area, wired, or wireless network, including network 930 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

I claim:

1. A system for automatically generating and executing computer programs using artificial intelligence (AI) models, the system comprising:
at least one hardware processor; and
at least one non-transitory memory storing instructions, which, when executed by the at least one hardware processor, cause the system to:
receive, from a graphical user interface (GUI) of a computing device, an output generation request to generate an output using an unstructured dataset, wherein the output satisfies a guideline set defining an operative boundary set of the output generation request;
determine, using a first AI model set, a feature set of the unstructured dataset that includes (1) a variable set and (2) a corresponding value set of each variable in the variable set within the unstructured dataset;
responsive to one or more values in the corresponding value set of each variable satisfying a predefined threshold, dynamically generate, using a second AI model set, a programmatic workflow set stored in a distributed database by mapping a vector representation of each feature of the feature set to: (1) an antecedent set representative of the feature, (2) a corresponding programmatic workflow of the programmatic workflow set satisfying the operative boundary set of the guideline set, and (3) one or more nodes of the distributed database,
wherein the corresponding programmatic workflow triggers a sequence of computer-executable commands responsive to satisfying the antecedent set,
wherein each node of the one or more nodes are assigned a unique hash by applying a particular hash function on the node, and
wherein the one or more nodes are each linked to a corresponding unique hash of a different node in the distributed database;
automatically execute, using a third AI model set, the sequence of computer-executable commands triggered by the programmatic workflow set on the computing device to generate an artifact responsive to the output generation request; and
display, on the GUI of the computing device, a graphical layout that includes (1) a first graphical representation indicative of the output generation request, (2) a second graphical representation indicative of the programmatic workflow set, and (3) a third graphical representation indicative of the generated artifact.

2. The system of claim 1, wherein the system is further caused to:
responsive to the execution of the sequence of the computer-executable commands, storing an indication of the execution in the distributed database,
wherein the indication is linked to the one or more nodes of the distributed database.

3. The system of claim 1, wherein the system is further caused to:
generate a similarity score between the feature set and a plurality of historical feature sets by determining a degree of similarity between vector representations of one or more feature within the feature set with vector representations of one or more historical features of the historical feature set; and
generate the programmatic workflow set using a historical programmatic workflow set associated with a historical feature set that has a highest similarity score with the feature set.

4. The system of claim 1, wherein the system is further caused to:
generate a confidence score for each feature of the feature set; and
compare the confidence score to a particular threshold, wherein each feature of the feature set satisfies the particular threshold.

5. The system of claim 1, wherein each programmatic workflow of the programmatic workflow set is associated with:
an explanation associated with one or more of: the antecedent set or the sequence of computer-executable commands,
a timestamp, and
a version identifier.

6. The system of claim 1,
wherein the distributed database is a blockchain network, and
wherein the programmatic workflow set comprises one or more smart contracts.

7. A non-transitory, computer-readable storage medium comprising instructions thereon, wherein the instructions, when executed by at least one data processor of a system, cause the system to:
receive, from a graphical user interface (GUI) of a computing device, an output generation request to generate an output using an unstructured dataset, wherein the output satisfies a guideline set defining an operative boundary set of the output generation request;

determine, using a first AI model set, a feature set of the unstructured dataset that includes (1) a variable set and (2) a corresponding value set of one or more variables each variable in the variable set within the unstructured dataset;

responsive to one or more values in the corresponding value set of each variable satisfying a predefined threshold, dynamically generate, using a second AI model set, a programmatic workflow set stored in a distributed database by mapping a vector representation of each feature of the feature set to one or more of: (1) an antecedent set representative of the feature, (2) a corresponding programmatic workflow of the programmatic workflow set satisfying the operative boundary set of the guideline set, and (3) one or more nodes of the distributed database, wherein the corresponding programmatic workflow triggers a sequence of computer-executable commands responsive to satisfying the antecedent set, wherein each node of the one or more nodes are assigned a unique hash by applying a particular hash function on the node, and wherein the one or more nodes are each linked to a corresponding unique hash of a different node in the distributed database;

automatically execute, using a third AI model set, the sequence of computer-executable commands triggered by the programmatic workflow set on the computing device to generate an artifact responsive to the output generation request; and display, on the GUI of the computing device, a graphical layout that includes (1) a first graphical representation indicative of the output generation request, (2) a second graphical representation indicative of the programmatic workflow set, and (3) a third graphical representation indicative of the generated artifact.

8. The non-transitory, computer-readable storage medium of claim 7, wherein one or more of: the first AI model set, the second AI model set, and the third AI model set are the same.

9. The non-transitory, computer-readable storage medium of claim 7, wherein one or more of: the first AI model set, the second AI model set, and the third AI model set are different.

10. The non-transitory, computer-readable storage medium of claim 7, wherein the system is further caused to:
generate a similarity score between the feature set and a plurality of historical feature sets by determining a degree of similarity between vector representations of one or more feature within the feature set with vector representations of one or more historical features of the historical feature set; and
generate the programmatic workflow set using a historical programmatic workflow set associated with a historical feature set that has a highest similarity score with the feature set.

11. The non-transitory, computer-readable storage medium of claim 7, wherein the system is further caused to:
generate a confidence score for each feature of the feature set; and
compare the confidence score to a particular threshold, wherein each feature of the feature set satisfies the particular threshold.

12. The non-transitory, computer-readable storage medium of claim 7, wherein each programmatic workflow of the programmatic workflow set is associated with:
an explanation associated with one or more of: the antecedent set or the sequence of computer-executable commands,
a timestamp, and
a version identifier.

13. The non-transitory, computer-readable storage medium of claim 7,
wherein the distributed database is a blockchain network, and
wherein the programmatic workflow set comprises one or more smart contracts.

14. A computer-implemented method for automatically generating and executing computer programs using artificial intelligence (AI) models, the computer-implemented method comprising:
receiving, from a graphical user interface (GUI) of a computing device, an output generation request to generate an output using an unstructured dataset,
wherein the output satisfies a guideline set defining an operative boundary set of the output generation request;
determining, using a first AI model set, a feature set of the unstructured dataset that includes (1) a variable set and (2) a corresponding value set of each variable in the variable set within the unstructured dataset;
responsive to one or more values in the corresponding value set of each variable satisfying a predefined threshold, dynamically generating, using a second AI model set, a programmatic workflow set stored in a distributed database by mapping a vector representation of each feature of the feature set to: (1) an antecedent set representative of the feature, (2) a corresponding programmatic workflow of the programmatic workflow set satisfying the operative boundary set of the guideline set, and (3) one or more nodes of the distributed database,
wherein the corresponding programmatic workflow triggers a sequence of computer-executable commands responsive to satisfying the antecedent set,
wherein each node of the one or more nodes are assigned a unique hash by applying a particular hash function on the node, and
wherein the one or more nodes are each linked to a corresponding unique hash of a different node in the distributed database;
automatically executing, using a third AI model set, the sequence of computer-executable commands triggered by the programmatic workflow set on the computing device to generate an artifact responsive to the output generation request; and
displaying, on the GUI of the computing device, a graphical layout that includes (1) a first graphical representation indicative of the output generation request, (2) a second graphical representation indicative of the programmatic workflow set, and (3) a third graphical representation indicative of the generated artifact.

15. The computer-implemented method of claim 14, wherein one or more of: the first AI model set, the second AI model set, and the third AI model set are the same.

16. The computer-implemented method of claim 14, further comprising:
responsive to the execution of the sequence of the computer-executable commands, storing an indication of the execution in the distributed database, wherein the indication is linked to the one or more nodes of the distributed database.

17. The computer-implemented method of claim 14, further comprising:
generating a similarity score between the feature set and a plurality of historical feature sets by determining a degree of similarity between vector representations of one or more feature within the feature set with vector representations of one or more historical features of the historical feature set; and
generating the programmatic workflow set using a historical programmatic workflow set associated with a historical feature set that has a highest similarity score with the feature set.

18. The computer-implemented method of claim 14, further comprising:
generating a confidence score for each feature of the feature set; and
comparing the confidence score to a particular threshold, wherein each feature of the feature set satisfies the particular threshold.

19. The computer-implemented method of claim 14, wherein each programmatic workflow of the programmatic workflow set is associated with:
an explanation associated with one or more of: the antecedent set or the sequence of computer-executable commands,
a timestamp, and
a version identifier.

20. The computer-implemented method of claim 14, wherein the distributed database is a blockchain network, and
wherein the programmatic workflow set comprises one or more smart contracts.

* * * * *